United States Patent
Nagamura et al.

(10) Patent No.: US 7,453,620 B2
(45) Date of Patent: Nov. 18, 2008

(54) SPATIAL OPTICAL MODULATION ELEMENT AND SPATIAL OPTICAL MODULATION METHOD

(75) Inventors: Toshihiko Nagamura, Fukuoka (JP); Ikuo Matsukura, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 257 days.

(21) Appl. No.: 11/366,470

(22) Filed: Mar. 3, 2006

(65) Prior Publication Data

US 2006/0146388 A1 Jul. 6, 2006

Related U.S. Application Data

(63) Continuation of application No. PCT/JP2004/013182, filed on Sep. 3, 2004.

(30) Foreign Application Priority Data

Sep. 3, 2003 (JP) .............................. 2003-311823

(51) Int. Cl.
*G02B 1/03* (2006.01)
(52) U.S. Cl. .................. 359/244; 359/262; 359/263
(58) Field of Classification Search ................ 359/237, 359/244, 262, 263, 321; 430/581–590
See application file for complete search history.

(56) References Cited

U.S. PATENT DOCUMENTS

| | | |
|---|---|---|
| 4,754,009 A | 6/1988 | Squire |
| 4,897,457 A | 1/1990 | Nakamura et al. |
| 4,935,477 A | 6/1990 | Squire |
| 6,437,887 B1 * | 8/2002 | Usami et al. ................. 359/108 |
| 6,611,367 B1 | 8/2003 | Naya et al. |
| 2003/0026574 A1 | 2/2003 | Suzuki et al. |

FOREIGN PATENT DOCUMENTS

EP 0 073 087 5/1986

(Continued)

OTHER PUBLICATIONS

Araz Yacoubian and Tin M. Aye, "Enhanced Optical Modulation Using Azo-Dye Polymers", Applied Optics, vol. 32, No. 17, Jun. 10, 1993, pp. 3073-3080 (Copy attached).

(Continued)

*Primary Examiner*—Timothy J Thompson
(74) *Attorney, Agent, or Firm*—Oblon, Spivak, McClelland, Maier & Neustadt, P.C.

(57) ABSTRACT

To provide a spatial optical modulation element having a long life free from a deterioration of optical modulation characteristics even if a high power laser beam with an ultra-short pulse is used as a modulation drive light. A spatial optical modulation element 1 wherein disposed between a prism 2 and an optical functional material layer 3 made of an optical functional material with the refractive index changeable by light irradiation, is a low refractive index layer 4 made of a transparent material with a refractive index lower than the refractive index of the dielectric. A spatial optical modulation method characterized in that using such a spatial optical modulation element 1, at the interface between the prism and the low refractive index layer, reflection of a to-be-modulated light 5 entering through the prism, is controlled by a modulation drive light 6.

7 Claims, 12 Drawing Sheets

FOREIGN PATENT DOCUMENTS

| | | |
|---|---|---|
| JP | 63-18964 | 4/1988 |
| JP | 63-238111 | 10/1988 |
| JP | 63-238115 | 10/1988 |
| JP | 04-190202 | 7/1992 |
| JP | 5-273503 | 10/1993 |
| JP | 06-123898 | 5/1994 |
| JP | 2000-81519 | 3/2000 |
| JP | 2000-292758 | 10/2000 |
| JP | 2000-298252 | 10/2000 |
| JP | 2000-314857 | 11/2000 |
| JP | 2000-314859 | 11/2000 |
| JP | 2000-314860 | 11/2000 |
| JP | 2002-258332 | 9/2002 |
| JP | 2002-328349 | 11/2002 |

OTHER PUBLICATIONS

U.S. Appl. No. 11/411,805, filed Apr. 27, 2006, Nagamura et al.
U.S. Appl. No. 11/366,470, filed Mar. 3, 2006, Nagamura et al.
M. Haelterman, et al. "Demonstration of optical bistability with a nonlinear frustrated-total-reflection filter" Applied Physics Letters, vol. 56, No. 6, Feb. 5, 1990 (Feb. 5, 1990), pp. 512-514, XP000128461.

* cited by examiner

SPATIAL OPTICAL MODULATION ELEMENT AND SPATIAL OPTICAL MODULATION METHOD

TECHNICAL FIELD

The present invention relates to a spatial optical modulation element to be used for e.g. display devices or optical information treatment devices, and a spatial optical modulation method. More particularly, it relates to a spatial optical modulation element whereby the useful life is long, the modulation response sensitivity is high and optical modulation at a high speed is made possible by using a low refractive index layer instead of a conventional metal layer for reflecting a to-be-modulated light, to reflect or confine by a waveguide mode the to-be-modulated light, and a spatial optical modulation method.

BACKGROUND ART

Heretofore, as a spatial optical modulation element employing a surface plasmon resonance, an element has been proposed wherein on one side of a prism, a metal layer and an optical functional film made of a material with the refractive index changeable by light irradiation (which may be referred to also as a colorant-containing film) are laminated (e.g. Patent Documents 1 to 6). This element is an element having a structure such that a to-be-modulated light is permitted to enter through the prism and confined or reflected by the metal film, and when it emerges from the prism, a modulation drive light is irradiated to the optical functional film, as the case requires, so that the condition for confining the to-be-modulated light is changed by ON/OFF of the modulation drive light to make high speed optical modulation practically possible.

Patent Document 1: JP-A-5-273503
Patent Document 2: JP-A-2000-292758
Patent Document 3: JP-A-2000-314857
Patent Document 4: JP-A-2000-314859
Patent Document 5: JP-A-2000-314860
Patent Document 6: JP-A-2002-258332

DISCLOSURE OF THE INVENTION

However, the conventional spatial optical modulation element has a problem such that if a high power laser beam with an ultra-short pulse such as femtosecond laser is employed as the modulation drive light, the metal layer will be damaged, the optical modulation characteristics of the to-be-modulated light are likely to deteriorate, and the life of the element tends to be short.

The present invention has been made in view of the above situation, and it is an object of the present invention to provide a spatial optical modulation element having a long life free from a deterioration of the optical modulation characteristics even if a high power laser beam with an ultra-short pulse is used as the modulation drive light.

To accomplish the object, the present invention provides a spatial optical modulation element characterized in that disposed between a dielectric and an optical functional material layer made of an optical functional material with the refractive index changeable by light irradiation, is a low refractive index layer made of a transparent material with a refractive index lower than the refractive index of the dielectric.

Further, the present invention provides a spatial optical modulation element characterized in that disposed between a dielectric and an optical functional material layer made of an optical functional material with the refractive index changeable by light irradiation, is a low refractive index layer made of a transparent material with a refractive index lower than the refractive index of the dielectric, and it is constructed so that at the interface between the dielectric and the low refractive index layer, reflection of a to-be-modulated light entering through the dielectric, is controlled by a modulation drive light.

In the spatial optical modulation element of the present invention, the above-mentioned low refractive index layer is preferably made of an organic material.

Further, the above low refractive index layer is preferably made of a fluororesin.

This fluororesin is preferably made of a non-crystalline fluoropolymer having no C—H bond.

Further, the present invention provides a spatial optical modulation method characterized in that using a spatial optical modulation element wherein disposed between a dielectric and an optical functional material layer made of an optical functional material with the refractive index changeable by light irradiation, is a low refractive index layer made of a transparent material with a refractive index lower than the refractive index of the dielectric, at the interface between the dielectric and the low refractive index layer, reflection of a to-be-modulated light entering through the dielectric, is controlled by a modulation drive light.

In the spatial optical modulation method of the present invention, it is preferred that the control of the reflection of the to-be-modulated light by the modulation drive light is a combination of reflection of the to-be-modulated light and confinement of the to-be-modulated light by a waveguide mode.

EFFECTS OF THE INVENTION

The spatial optical modulation element of the present invention is provided with a transparent low refractive index layer instead of a conventional metal layer and is designed so that the to-be-modulated light is reflected at the interface between the dielectric and the low refractive index layer, and a modulation drive light is irradiated to the optical functional material as the case requires to carry out modulation and control of the to-be-modulated light by ON/OFF of the modulation drive light, whereby the damage which the element will receive by the to-be-modulated light and the modulation drive light irradiated to the optical functional material layer, will be reduced, and it will be possible to obtain an element which is excellent in durability and has a long life and which is operable constantly over a long period of time even when a high power laser beam such as a femtosecond laser beam is employed.

Further, by the construction provided with a transparent low refractive index layer instead of a metal layer, the reflectance of the to-be-modulated light will be changed with a high sensitivity by ON/OFF of the modulation drive light, the modulation response sensitivity becomes very high, and modulation at a higher speed becomes possible, and it becomes possible to realize a spatial optical modulation element having a response speed of a pico second order.

Further, by the construction provided with a transparent low refractive index layer instead of a metal layer, the incident angle and the output angle of the to-be-modulated light will be large, whereby generation of noises due to leakage and detection of the modulation drive light on the output side, will be reduced.

MEANINGS OF SYMBOLS 1, 7 . . . Spatial optical modulation element, 2 . . . prism (dielectric), 3 . . . optical functional material layer, 4 . . . low refractive index layer, 5 . . . to-be-modulated light, 6 . . . modulation drive light, 8 . . . slide glass (dielectric), 11 . . . rotary stage, 12 . . . femtosecond laser beam source, 14 . . . BBO crystal, 15, 18 . . . half mirror, 16 . . . $D_2O/H_2O$ cell, 17 . . . variable delay line, 19, 20 . . . optical fiber, 21 . . . photodetector

BEST MODE FOR CARRYING OUT THE INVENTION

Figure 1:
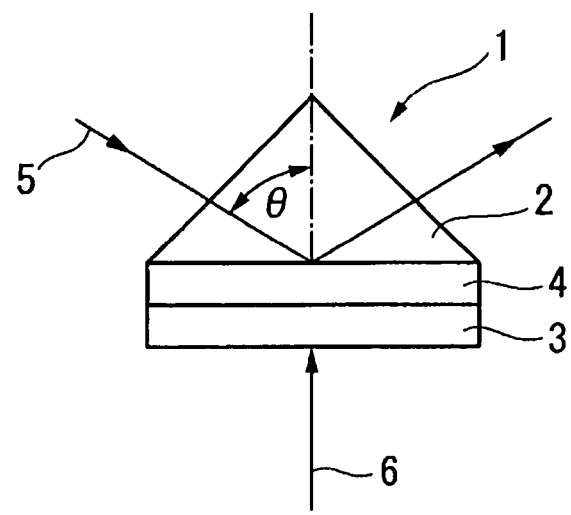
FIG. 1 is a side view showing a first embodiment of the spatial optical modulation element of the present invention.

FIG. 1 is a view showing a first embodiment of the spatial optical modulation element of the present invention. This spatial optical modulation element 1 comprises a prism 2 (dielectric) made of a dielectric, an optical functional material layer 3 made of an optical functional material with the refractive index changeable by light irradiation and, disposed between the prism and the optical functional material layer 3, a low refractive index layer 4 made of a transparent material with a refractive index n2 lower than the refractive index n1 of the dielectric constituting the prism 2, and is constructed so that at the interface between the prism 2 and the low refractive index layer 4, reflection of a to-be-modulated light 5 entering through the prism 2, is controlled by a modulation drive light 6.

In the present invention, as the dielectric to let the to-be-modulated light 5 enter, is not limited to such a prism 2 and may be in other form such as a plate form, a thick plate form or a block form. It is particularly preferred to employ a prism 2 having a triangular cross section, since it is thereby possible to easily construct a structure wherein on its first surface of the low refractive index layer 4 and the optical functional material layer 3 are laminated, and from the second surface of the prism 2, the to-be-modulated light 5 is permitted to enter, and from the third surface of the prism 2, the reflected light is permitted to come out.

This prism 2 is made of a dielectric which is transparent to the wavelength of the to-be-modulated light 5. Particularly preferred is one made of a material having a refractive index within a range of from 1.4 to 3 to the wavelength of the to-be-modulated light. Specifically, BK7, quartz glass, high refractive index glass or polycarbonate may, for example, be mentioned. The difference (n1–n2) in refractive index between the prism 2 and the low refractive index layer 4 is preferably within a range of from 0.05 to 0.9.

The material constituting the above low refractive index layer 4 may be any material so long as it is a transparent material with the refractive index n2 being smaller than the refractive index n1 of the dielectric constituting the prism 2 (i.e. having a relation of n2<n1). However, it is preferably an inorganic material or organic material having good light resistance to the wavelength of the to-be-modulated light. As such an inorganic material, a fluoride crystal or a fluorine-added quartz glass may, for example, be mentioned. Further, as such an organic material, a fluororesin may, for example, be mentioned. The low refractive index layer 4 made of an inorganic material may be formed by e.g. a sputtering method, a CVD method or a vapor deposition method. Whereas, the low refractive index layer 4 made of an organic material may be formed by e.g. a method of spin coating a resin solution. From the merits in the production such as the production costs and the production efficiency, it is preferred to employ an organic material, particularly a fluororesin, as the low refractive index layer 4 to be used for the spatial optical modulation element of the present invention.

The thickness of this low refractive index layer 4 is within a range of from 100 to 1,000 nm, preferably from 200 to 1,000 nm, more preferably from 300 to 800 nm. When the thickness of the low refractive index layer 4 is from 100 to 1,000 nm, modulation of the to-be-modulated light may be carried out satisfactorily, and it is possible to obtain sufficient durability and thereby to obtain a spatial optical modulation element having a long life.

In a suitable embodiment of the present invention, the low refractive index layer 4 is preferably made of a fluororesin. Further, such a fluororesin is preferably made of a non-crystalline fluoropolymer having no C—H bond. Such a fluoropolymer has a C—F bond (i.e. a carbon-fluorine bond) instead of a C—H bond. As a fluoropolymer, heretofore, a tetrafluoroethylene resin, a perfluoro(ethylene/propylene) resin, a perfluoroalkoxy resin, a vinylidene fluoride resin, an ethylene/tetrafluoroethylene resin or a chlorotrifluoroethylene resin may, for example, be widely known. However, such fluororesins have crystallinity, whereby scattering of light is likely to result, the transparency is likely to be poor, and fusion or the like may result when irradiated with the modulation drivel light 6, and thus the durability may be poor.

Whereas, a non-crystalline fluoropolymer is free from scattering of light by crystals and thus is excellent in transparency. The fluoropolymer is not particularly limited so long as it is a non-crystalline fluoropolymer having substantially no C—H bond. However, a fluoropolymer having a cyclic structure in its main chain is preferred. As such a fluoropolymer having a cyclic structure in its main chain, a fluoropolymer having a fluorinated aliphatic ring structure, a fluorinated imide ring structure, a fluorinated triazine ring structure or a fluorinated aromatic ring structure, is preferred. As the fluoropolymer having a fluorinated aliphatic ring structure, one having a fluorinated aliphatic ether ring structure is more preferred.

The polymer having a fluorinated aliphatic ring structure may be preferably one obtainable by polymerizing a monomer having a fluorinated ring structure or a polymer having a fluorinated alicyclic structure in its main chain obtainable by cyclopolymerization of a fluorinated monomer having at least two polymerizable double bonds.

The polymer having a fluorinated aliphatic ring structure in its main chain obtainable by polymerization of a monomer having a fluorinated aliphatic ring structure, is known from JP-B-63-18964. Namely, a polymer having a fluorinated aliphatic ring structure in its main chain can be obtained by homopolymerization of a monomer having a fluorinated aliphatic ring structure such as perfluoro(2,2-dimethyl-1,3-dioxol), or by copolymerization of such a monomer with a radical polymerizable monomer such as tetrafluoroethylene, chlorotrifluoroethylene or perfluoro(methyl vinyl ether).

Further, the polymer having a fluorinated aliphatic ring structure in its main chain obtainable by cyclopolymerization of a fluorinated monomer having at least two polymerizable double bonds, is known from e.g. JP-A-63-238111 or JP-A-63-238115. Namely, a polymer having a fluorinated aliphatic ring structure in its main chain can be obtained by cyclopolymerization of a monomer such as perfluoro(allyl vinyl ether) or perfluoro(butenyl vinyl ether), or by copolymerization of such a monomer with a radical polymerizable monomer such as tetrafluoroethylene, chlorotrifluoroethylene or perfluoro(methyl vinyl ether).

Further, the polymer having a fluorinated aliphatic ring structure in its main chain can be obtained also by copolymerizing a monomer having a fluorinated aliphatic ring structure such as perfluoro(2,2-dimethyl-1,3-dioxol) with a fluorinated monomer having at least two polymerizable double bonds such as perfluoro(allyl vinyl ether) or perfluoro(butenyl vinyl ether).

As the above polymer having a fluorinated aliphatic ring structure, one having repeating units selected from the following formulae (I) to (IV) may specifically be exemplified. Further, fluorine atoms in the polymer having such a fluorinated aliphatic ring structure may partly be substituted by chlorine atoms.

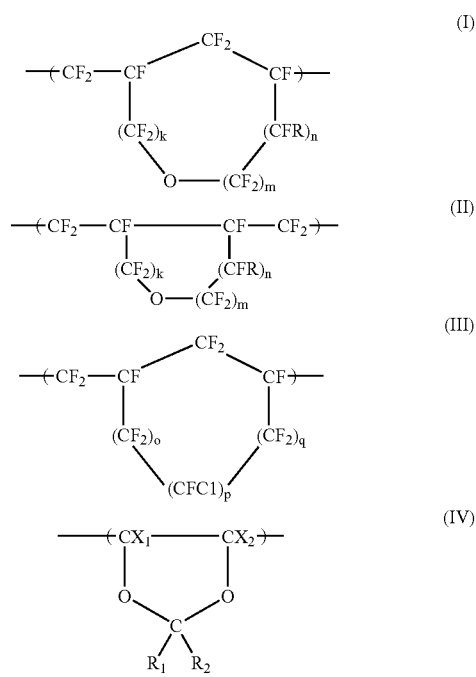

In the above formulae (I) to (IV), k is from 0 to 5, m is from 0 to 4, n is from 0 to 1, k+m+n is from 1 to 6, each of o, p and q is from 0 to 5, o+p+q is from 1 to 6, R is F or $CF_3$, $R_1$ is F or $CF_3$, $R_2$ is F or $CF_3$, $X_1$ is F or $C_1$, $X_2$ is F, Cl, ORf or Rf (wherein Rf is a $C_{1-3}$ perfluoroalkyl group).

The polymer having a fluorinated aliphatic ring structure is preferably a polymer having the ring structure in its main chain, and one containing at least 20 mol %, preferably at least 40 mol %, of polymerized units having a ring structure, is preferred from the viewpoint of the transparency, mechanical properties, etc.

In the present invention, the material for the optical functional material layer 3 may be selected for use among materials known as substances with refractive indices changeable by light irradiation. Such substances may, for example, be a material having methyl orange or methyl red doped on a polymer (polyvinyl alcohol) as disclosed, for example, in JP-A-5-273503, liquid crystal photorefractive crystal (such as barium titanate or bismuth silicate), purple membrane, photochromic material, or compounds represented by the following formulae (1) to (6) as disclosed in JP-A-2000-292758:

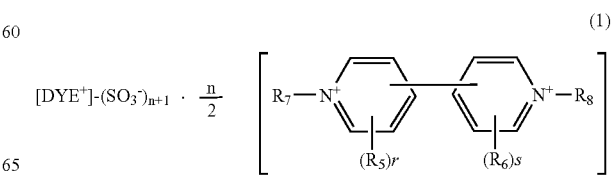

In the formula (1), DYE⁺ represents a monovalent cyanine dye cation, n is an integer of at least 1, each of $R_5$ and $R_6$ which are independent of each other, is a substituent, each of $R_7$ and $R_8$ which are independent of each other, is an alkyl group, an alkenyl group, an alkynyl group, an aralkyl group, an aryl group or a heterocyclic group, provided that $R_5$ and $R_6$, $R_5$ and $R_7$, $R_6$ and $R_8$, or $R_7$ and $R_8$, may be connected to each other to form a ring, and each of r and s which are independent of each other, is an integer of from 0 to 4, and when r and s are 2 or higher, a plurality of r and s may be the same or different.

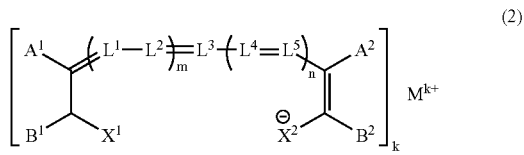
(2)

In the formula (2), each of $A^1$, $A^2$, $B^1$ and $B^2$ is a substituent, and each of $L^1$, $L^2$, $L^3$, $L^4$ and $L^5$ is a methine group, $X^1$ is =O, =NR or =C(CN)$_2$ (wherein R is a substituent), $X^2$ is —O, —NR, —C(CN)$_2$ (wherein R is a substituent), each of m and n is an integer of from 0 to 2, $M^{k+}$ is an onium ion, and k is a charge number.

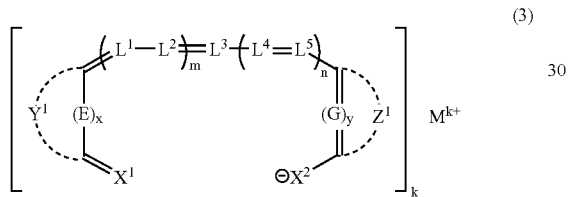
(3)

In the formula (3), each of $A^1$, $A^2$, $B^1$ and $B^2$ is a substituent, each of $L^1$, $L^2$, $L^3$, $L^4$ and $L^5$ is a methine group, $X^1$ is =O, =NR or =C(CN)$_2$ (wherein R is a substituent), $X^2$ is —O, —NR, —C(CN)$_2$ (wherein R is a substituent), each of m and n is an integer of from 0 to 2, each of $Y^1$ and E is atoms or an atomic group required to form a carbon ring or a hetero ring, each of $Z^1$ and G is atoms or an atomic group required to form a carbon ring or a hetero ring, each of x and y which are independent of each other, is 0 or 1, $M^{k+}$ is an onium ion, and k is a charge number.

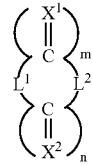
(5)

In the formula (5), each of m and n which are independent of each other, is an integer of from 0 to 2, each of $X^1$ and $X^2$ is =NR$^1$ or =CR$^2$R$^3$ (wherein each of $R^1$, $R^2$ and $R^3$ is a substituent), and each of $L^1$ and $L^2$ which are independent of each other, is a bivalent connecting group.

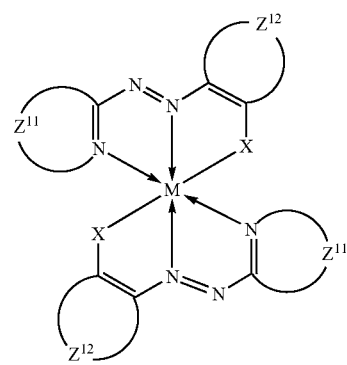
(6)

In the formula (6), M is a metal atom, X is an oxygen atom, a sulfur atom or =NR$^{21}$, $R^{21}$ is a hydrogen atom, an alkyl group, an aryl group, an acyl group, an alkylsulfonyl group or an arylsulfonyl group, $Z^{11}$ is an atomic group required to form a 5-membered or 6-membered nitrogen-containing hetero ring, and $Z^{12}$ is an atomic group required to complete an aromatic ring or a heteroaromatic ring.

The compounds of the above formulae (1) to (6) are used preferably in combination with a polymer compound to make them easily maintain the non-crystalline state. Such a polymer compound may, for example, be a natural polymer material such as gelatin, dextran, rosin or rubber, or a synthetic

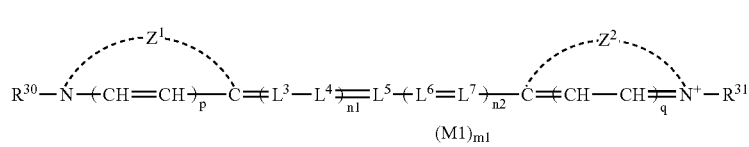
(4)

In the formula (4), each of $Z^1$ and $Z^2$ is an atomic group required to form a 5-membererd or 6-membered nitrogen-containing hetero ring, each of $R^{30}$ and $R^{31}$ which are independent of each other, is an alkyl group, each of $L^3$, $L^4$, $L^5$, $L^6$ and $L^7$ is a methine group, each of n1 and n2 is an integer of from 0 to 2, each of p and q which are independent of each other, is an integer of from 0 to 2, and M is a charge equilibrium counter ion.

polymer material, such as a cellulose derivative such as nitrocellulose, cellulose acetate or cellulose acetate butyrate, a hydrocarbon resin such as polyethylene, polystyrene, polypropylene or polyisobutylene, a fluoropolymer such as a tetrafluoroethylene resin, a perfluoro(ethylene/propylene) resin or a fluoropolymer having a fluorinated aliphatic ring structure, a fluorinated imide ring structure, a fluorinated triazine ring structure or a fluorinated aromatic ring structure, a vinyl resin such as polyvinyl chloride, polyvinylidene chloride or a polyvinyl chloride/polyvinyl acetate copolymer, an acrylic resin such as polyether, polyacrylamide, polymethyl acrylate or polymethyl methacrylate, or an initial polymer for a thermosetting resin, such as polyester, polyurethane, polyvinyl alcohol, chlorinated polyolefin, an epoxy resin, a butyral resin, a rubber derivative or a phenol/formaldehyde resin.

Another material for the optical functional material layer 3 to be suitably used in the present invention may be a compound represented by the following formula (7) as disclosed in JP-A-2002-328349:

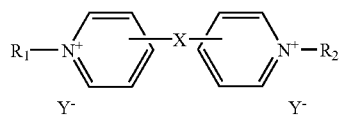

(7)

In the formula (7), X is a thiophenyl group, a furyl group, a bithiophenyl group, a terthiophenyl group, a pyrenyl group, a perylenyl group or a vinyl group, which is bonded at the 4- or 2-position to the nitrogen atoms of the bipyridinium groups, each of $R_1$ and $R_2$ which are independent of each other, is an alkyl group, a poly(tetramethyleneoxy) group, a hydroxyalkyl group, an alkenyl group, an alkynyl group, an aralkyl group, an aryl group or a hetero ring group, and $Y^-$ is a chloride, a bromide, an iodide, an aromatic molecule having an anionic substituent, or a tetraphenyl boric acid having a trifluoromethyl group or at least one other electron attracting substituent.

This compound of the formula (7) is preferably employed in a state dispersed in the above-mentioned polymer compound or in a state incorporated in a side chain or as a part of the main chain of the polymer compound. The polymer compound having the compound of the formula (7) dispersed or containing it in its side chain or as a part of the main chain, can easily be formed into a film by e.g. a method of spin coating its solution. This compound of the formula (7) is particularly preferred as an optical functional material to be used in the present invention, since it is excellent in the light resistance to a femtosecond laser beam suitable as the modulation drive light 6, whereby the durability of the optical functional material layer 3 of the spatial optical modulation element 1 employing a femtosecond laser will be high, and it will be possible to construct a spatial optical modulation element 1 having a long life.

In the present invention, the optical functional material may be any material so long as it is a material with the refractive index changeable by light irradiation. Further, the wavelength of the light to be irradiated, is not particularly limited, and the irradiation light may be selected within a wide range of from visible light to near infrared light. Namely, a material with the refractive index changeable upon absorption of the light with a wavelength to be used for irradiation, may be selected as the optical functional material.

In the spatial optical modulation element 1 of the present invention, the thickness of the optical functional material layer 3 is within a range of from 100 to 1,000 nm, preferably from 150 to 1,000 nm, more preferably from 250 to 800 nm. When the thickness of the optical functional material layer 3 is within the above range, modulation of the to-be-modulated light 5 can be carried out satisfactorily, and adequate durability can be obtained, and it is possible to obtain a spatial optical modulation element 1 having a long life.

Now, the optical modulation operation characteristics of this spatial optical modulation element 1 will be described.

To carry out optical modulation by using this spatial optical modulation element 1, a to-be-modulated light 5 is permitted to enter from the second surface of the prism 2 which has a triangular cross section as shown in FIG. 1, wherein the low refractive index layer 4 and the optical functional material layer 3 are laminated on the first surface. The to-be-modulated light 5 is reflected at the interface between the prism 2 and the low refractive index layer 4 when the incident angle θ is within a prescribed range and comes out from the third surface of the prism. The range of the incident angle θ at that time is within a range of from 40° to 85° and particularly preferably adjusted to an angle at which a waveguide mode will be formed when the optical functional material layer 3 is irradiated with the modulation drive light 6 and the to-be-modulated light 5 is confined. The wavelength of the to-be-modulated light 5 to enter into the prism 2 is not particularly limited.

When the optical functional material layer 3 of this spatial optical modulation element 1 is irradiated with the modulation drive light 6, as the case requires, the extinction coefficient k of the optical functional material layer 3 will increase, and by the increase of this extinction coefficient k, the above-mentioned reflectance of the to-be-modulated light 5 will be sharply changed, and modulation of the to-be-modulated light 5 coming out from the third surface of the prism 2 will be carried out by ON/OFF of the modulation drive light 6. In a case where the to-be-modulated light 5 is permitted to enter at an angle to meet the angle at which the waveguide mode will be formed when the optical functional material layer 3 is irradiated with the modulation drive light 6 and the to-be-modulated light 5 will be confined, at the time of OFF when no irradiation by the modulation rive light 6 is carried out, the reflectance of the to-be-modulated light 5 will not be changed, and almost all incident light will be reflected at the interface between the prism 2 and the low refractive index layer 4 and comes out from the third surface of the prism 2. On the other hand, when the optical functional material layer 3 is irradiated with the modulation drive light 6 (at the time of ON), the extinction coefficient k of the optical functional material layer 3 will be increased, and by the increase of this extinction coefficient k, the reflectance of the to-be-modulated light 5 will be sharply lowered, whereby the to-be-modulated light 5 coming out from the third surface of the prism 2 sharply becomes weak or substantially extinct. Here, the sharp drop in the reflectance of the to-be-modulated light 5 is due to the fact that a standing wave is formed as a waveguide mode inbetween from the interface between the prism 2 and the low refractive index layer 4 to the low refractive index layer 4 or the optical functional material layer 3, and consequently, no reflection becomes observable. Accordingly, optical switching or intensity modulation of the to-be-modulated light 5 is possible by ON/OFF of the modulation drive light 6.

The change in the reflectance caused by the ON/OFF switching of the modulation drive light 6 is at most 1 pico second at the time of ON and from a few pico seconds to a few hundreds pico seconds at the time of OFF, and thus, by this spatial optical modulation element 1, extremely high speed optical modulation becomes possible.

This spatial optical modulation element 1 is provided with the transparent low refractive index layer 4 instead of a conventional metal layer and is designed so that the to-be-modulated light 5 is reflected at the interface between the prism 2 and the low refractive index layer 4, and the optical functional material layer 3 is irradiated with the modulation drive light 6, as the case requires, to carry out modulation of the to-be-modulated light 5 by ON/OFF of the modulation drive light 6, whereby the damage which the element receives by the to-be-modulated light 5 and the modulation drive light 6 irradiated to the optical functional material layer 3, will be reduced, and it will be possible to obtain an element which is operable constantly for a long period of time even when a high power laser beam such as a femtosecond laser beam is employed and which is excellent in durability and has a long life.

Further, by the construction provided with the transparent low refractive index layer 4 instead of the metal layer, the reflectance of the to-be-modulated light 5 will be changed with a high sensitivity by ON/OFF of the modulation drive light 6, the modulation response sensitivity becomes extremely high, modulation at a higher speed becomes possible, and it becomes possible to realize a spatial optical modulation element having a response speed of pico second order.

Further, by the construction provided with the transparent low refractive index layer 4 instead of the metal layer, the incident angle and the output angle of the to-be-modulated light 5 become large, whereby generation of noises caused by leakage and detection of the modulation drive light 6 on the output side can be reduced.

Figure 2:
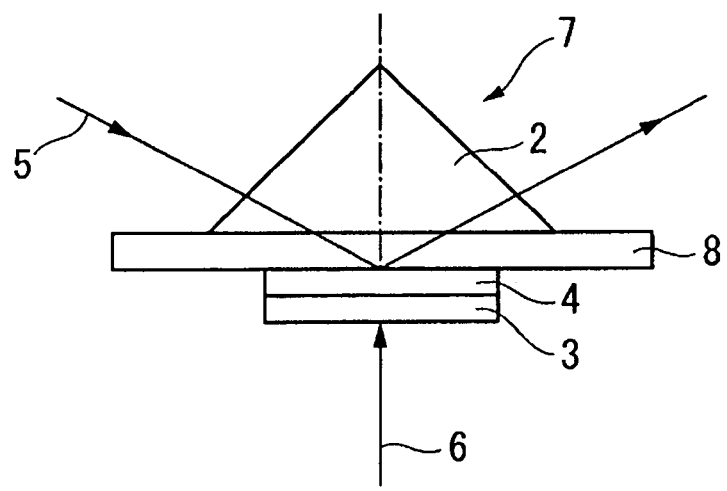
FIG. 2 is a side view showing a second embodiment of the spatial optical modulation element of the present invention.

FIG. 2 is a view showing a second embodiment of the spatial optical modulation element of the present invention. This spatial optical modulation element 7 comprises substantially the same constituting components as the spatial optical modulation element 1 according to the first embodiment, and the same constituting components are identified by the same symbols. The difference of this spatial optical modulation element 7 from the spatial optical modulation element 1 according to the first embodiment is that a slide glass 8 having the same refractive index (n1) as the prism 2, is employed, and the low refractive index layer 4 and the optical functional material layer 3 are laminated on one side of this slide glass 8, and the prism 2 is fixed on the other side of this slide glass 8, so that the to-be-modulated light 5 entering from the prism 2 is reflected at the interface between the slide glass 8 and the low refractive index layer 4. The prism 2 and the slide glass 8 are preferably fixed via a matching solution or a transparent resin adhesive having the same refractive index as their materials.

With this spatial optical modulation element 7, it is possible to carry out high speed modulation of the to-be-modulated light 5 by ON/OFF of the modulation drive light in the same manner as the spatial optical modulation element 1 according to the first embodiment shown in FIG. 1, and it is possible to obtain the same effects as the spatial optical modulation element 1 according to the first embodiment. Further, this spatial optical modulation element 7 is one wherein the low refractive index layer 4 and the optical functional material layer 3 are laminated on one side of the slide glass 8, whereby it becomes easy to form the low refractive index layer 4 and the optical functional material layer 3 by e.g. a spin coating method, it becomes easy to produce the spatial optical modulation element 1, and the production costs can be reduced. As another embodiment, the spatial optical modulation element can be constructed by using a diffraction grating instead of the prism.

Now, the effects of the present invention will be described in further detail with reference to Examples.

EXAMPLES

Preparation of Conventional Spatial Optical Modulation Element

On one side of a slide glass (refractive index n1=1.52), a silver (Ag) thin film having a thickness of 50 nm was formed by a vacuum vapor deposition method, and on this silver thin film, an optical functional material layer having a thickness of 600 nm and made of PFVI represented by the following formula (8), was formed by a spin coating method. Further, on the other side of this slide glass, a prism made of glass having a triangular cross section was placed to obtain a conventional spatial optical modulation element having a silver thin film (hereinafter referred to as the Ag type element).

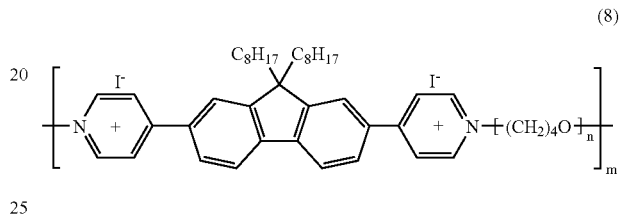

(8)

Preparation of Spatial Optical Modulation Element of the Present Invention

On one side of a slide glass (refractive index n1=1.52), a thin film of a fluororesin having a thickness of 400 nm was formed by a spin coating method. Here, as the fluororesin, a fluoropolymer having an aliphatic ring structure in its main chain (CYTOP (registered trademark), manufactured by Asahi Glass Company, Limited, refractive index n2=1.34) obtained by cyclopolymerization of perfluoro(butenyl vinyl ether), was used. This polymer is a non-crystalline fluoropolymer having no C—H bond. On the low refractive index layer made of this fluororesin, an optical functional material layer having a thickness of 600 nm and made of PFVI represented by the formula (8), was formed by a spin coating method. Further, on the other side of this slide glass, a prism made of glass having a triangular cross section (refractive index n1=1.52) was placed to obtain a spatial optical modulation element of the present invention having the low refractive index layer (hereinafter referred to as the element of the present invention).

Measurement of Modulation Operation Characteristics

Figure 3:
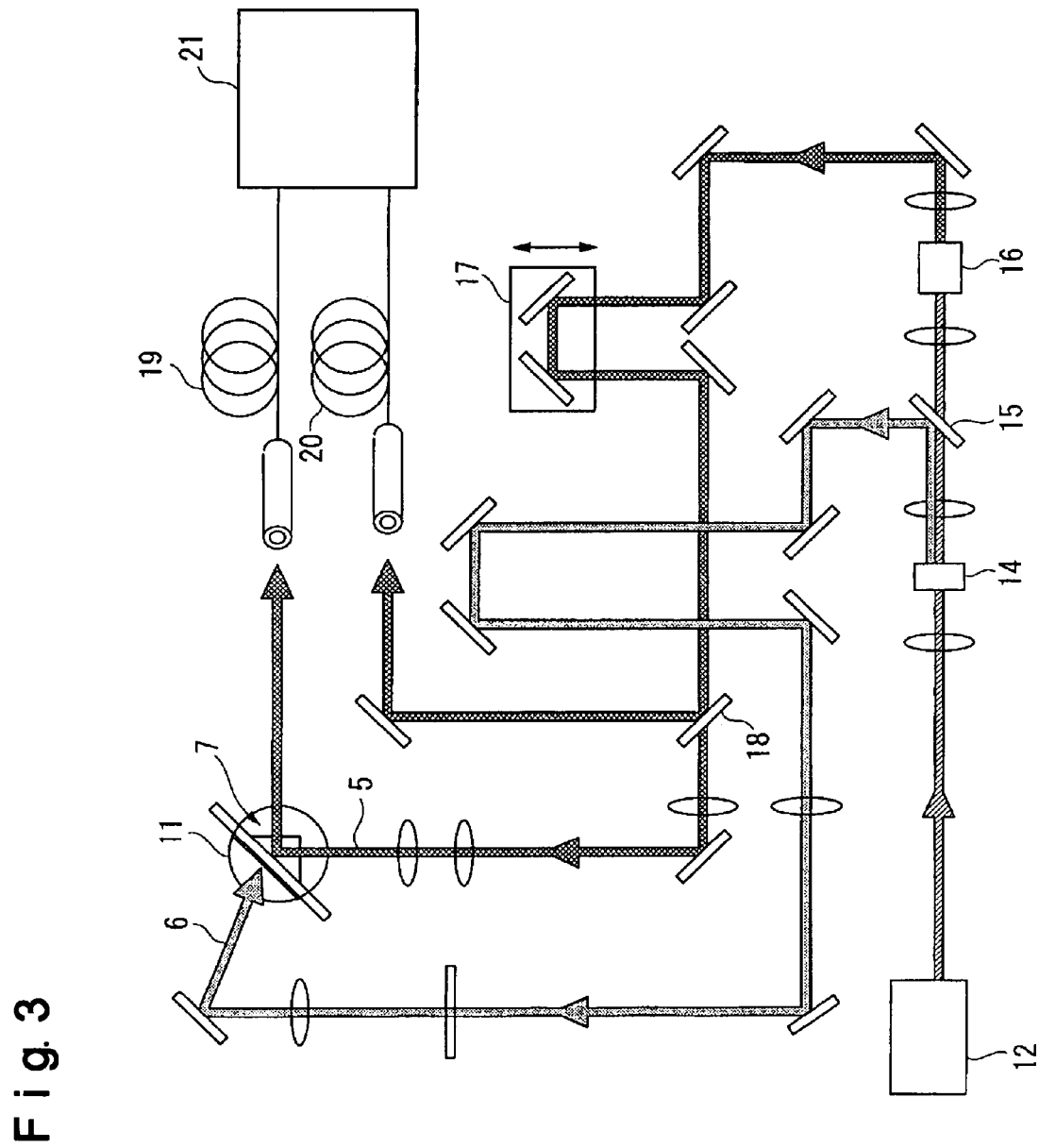
FIG. 3 is a view showing the construction of a measuring system used in the measurement in the test of Examples.

FIG. 3 is a view showing the construction of the measurement system used for measuring the respective modulation operation characteristics of the Ag type element and the element of the present invention prepared as described above.

The Ag type element or the element of the present invention is set on a rotary stage 11. This rotary stage 11 is designed so that the incident angle θ of the element 7 can be optionally adjusted by changing the angle of the element 7 to the incident direction of the to-be-modulated light 5.

For the to-be-modulated light 5 and the modulation drive light 6, a laser beam irradiated from a femtosecond laser beam source 12 is divided for use. The laser beam irradiated from the femtosecond laser beam source 12 is made into a second harmonic having a half wavelength by the BBO crystal 14, and this second harmonic is divided into two by a half mirror 15. The transmitted light from the half mirror 15 is condensed in a $D_2O/H_2O$ cell 16 to form a femtosecond white light, and this light is led to a variable delay line 17 to obtain a necessary time lag. The light coming out from this variable delay line 17 is divided into two by a half mirror 18. The transmitted light from the half mirror 18 is permitted to enter into a prism of the element 7 set on the rotary stage. The reflected light (the second harmonic) from the first half mirror 15 is irradiated to the optical functional material layer of the element 7 to be the modulation drive light 6. The to-be-modulated light coming out from the element 7 is, via an optical fiber 19, permitted to enter into a photodetector 21. The reflected light from the second half mirror 18 is, as a reference light, via an optical fiber 20 permitted to enter into the photodetector 21.

Calculation Results

FIGS. 4 to 11 show the results of calculations by a transfer matrix method.

Figure 4:
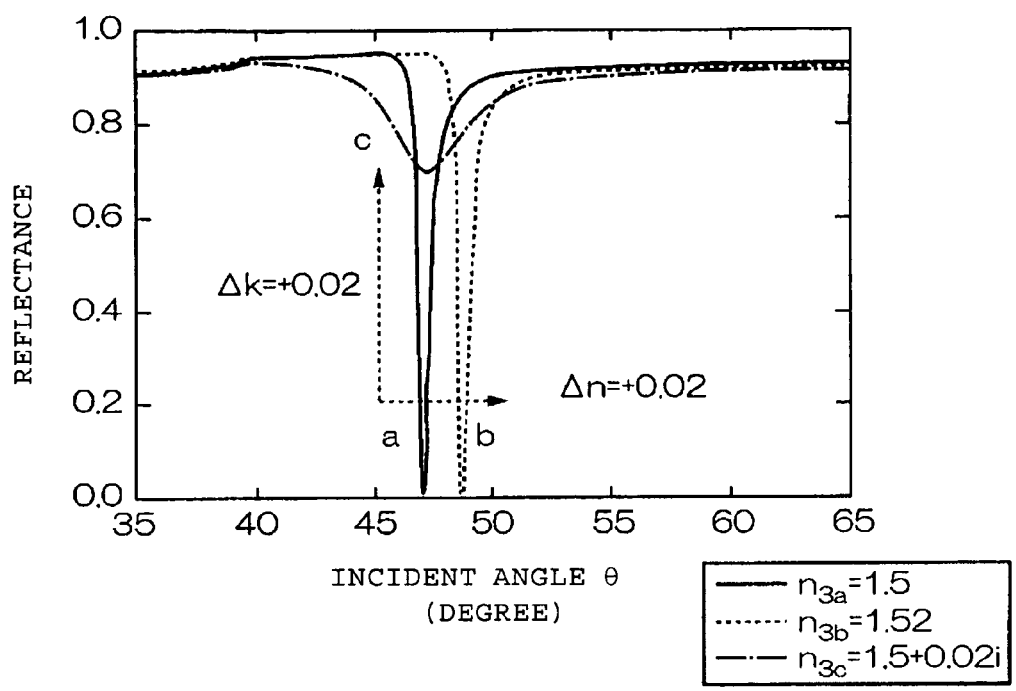
FIG. 4 is a graph of the waveguide mode operation characteristics calculated with respect to a Ag type element.

FIG. 4 is a graph of the waveguide mode operation characteristics calculated with respect to the Ag type element. In this calculation, as the to-be-modulated light 5, a He—Ne laser beam of green color (543 nm) was is used, and the thickness of the optical functional material layer was 600 nm.

In this FIG., the curve (a) shows the relation between the reflectance and the incident angle θ of the to-be-modulated light 5 when a material with a refractive index $n_{3a}$=1.5 was used as the optical functional material layer, and the curve (b) shows the relation between the reflectance and the incident angle θ of the to-be-modulated light 5 when a material with a refractive index $n_{3b}$=1.52 was used as the optical functional material layer, and the curve (c) shows the relation between the reflectance and the incident angle θ of the to-be-modulated light 5 when a material with a refractive index of 1.5 was used as the optical functional material layer and irradiated with the modulation drive light 6 to have the imaginary part of the refractive index changed (refractive index $n_{3c}$=1.5+0.02i).

In the case of the Ag type element, when the refractive index of the optical functional material layer is within a range of from 1.5 to 1.52, a waveguide mode is present, and the reflectance is lowered when the incident angle θ is from 45 to 50°. From a comparison between when the modulation drive light 6 is ON (b) and (c) and when it is OFF (a), it is evident that if the real part and/or the imaginary part of the refractive index is changed by switching ON/OFF of the modulation drive light 6, the reflectance at an incident angle showing the minimum reflectance at the time of OFF is changed.

Figure 5:
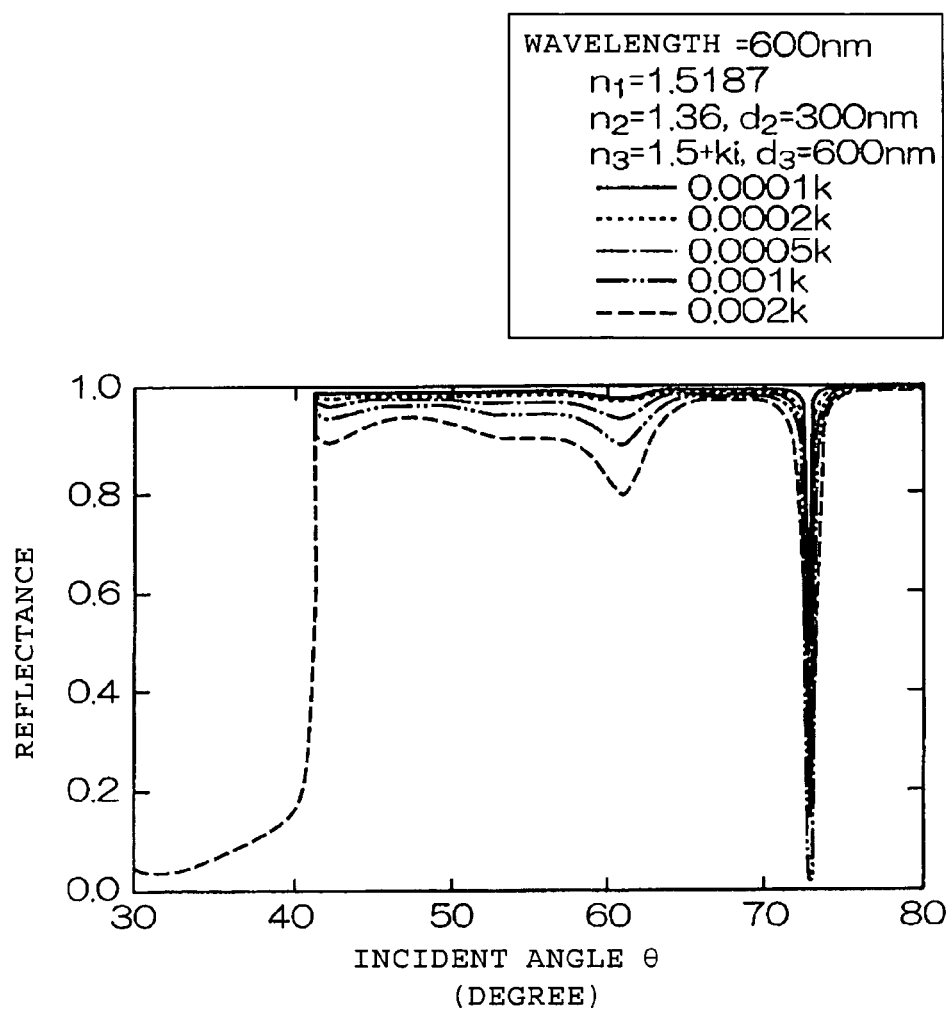
FIG. 5 is a graph showing the waveguide mode operation characteristics calculated with respect to the element of the present invention.
Figure 6:
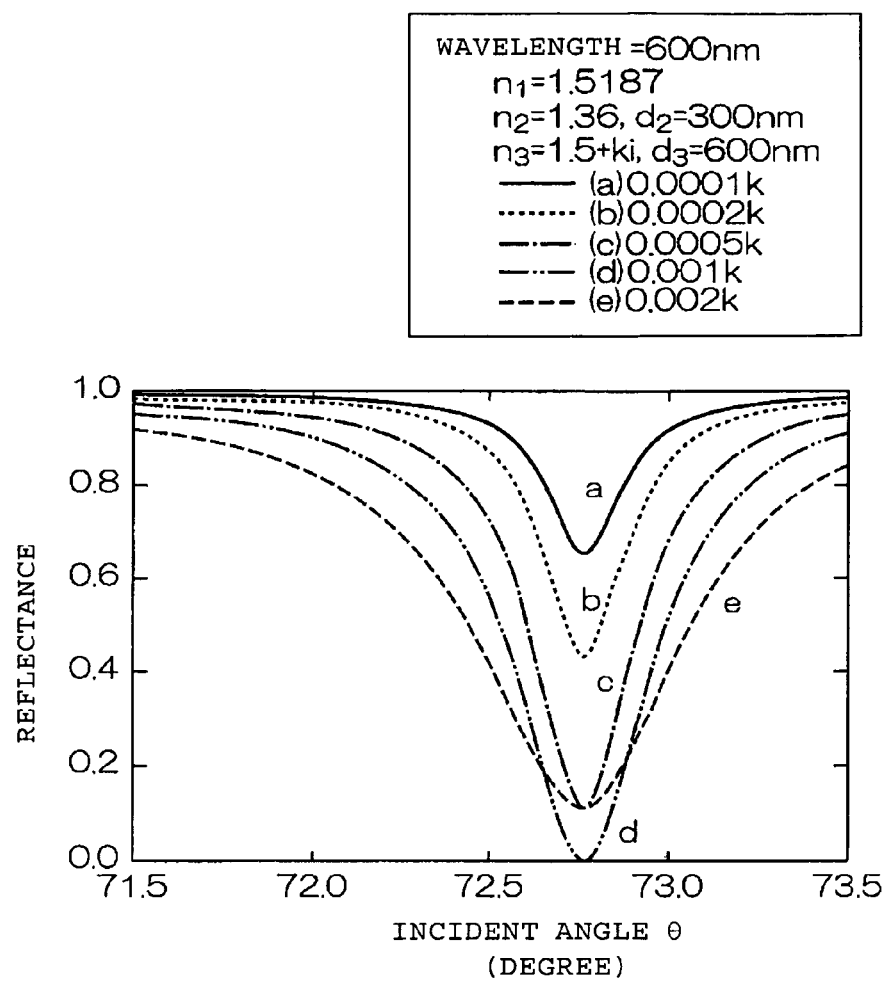
FIG. 6 is an enlarged view of the main portion of FIG. 5.

FIG. 5 is a graph showing the waveguide mode operation characteristics calculated with respect to the element of the present invention, and FIG. 6 is an enlarged view of the main portion of FIG. 5. In this calculation, the wavelength of the to-be-modulated light 5 was 600 nm. The change in the refractive index of the optical functional material layer is adjusted by optionally adjusting the irradiation intensity of the modulation drive light 6 irradiated to the optical functional material layer, thereby to adjust so that the extinction coefficient k will be a prescribed value of from 0.0001 to 0.002, whereby the reflectance to the incident angle θ is calculated.

In these Figs., the curve (a) shows the change in the reflectance when the extinction coefficient k is 0.0001, the curve (b) shows the change in the reflectance when the extinction coefficient k is 0.0002, the curve (c) shows the change in the reflectance when the extinction coefficient k is 0.0005, the curve (d) shows the change in the reflectance when the extinction coefficient k is 0.001, and the curve (e) shows the change in the reflectance when the extinction coefficient k is 0.002.

When a low refractive index layer is employed instead of a silver thin film, a waveguide mode will appear within a fairly wide range of the incident angle. Among such waveguide modes, with respect to a waveguide mode in a range of the incident angle θ=72.5 to 73.0 where the change in the reflectance is most remarkable, the change in the reflectance was calculated in a case where the extinction coefficient k is optionally changed, whereby as shown in FIG. 6, a characteristic is observed such that the reflectance sharply decreases by a slight increase of the extinction coefficient k. In the case of the above-mentioned Ag type element, the reflectance increased as the extinction coefficient k increased. Thus, the element of the present invention shows a response opposite to the Ag type element to a change in a range where the extinction coefficient k is small.

Figure 7:
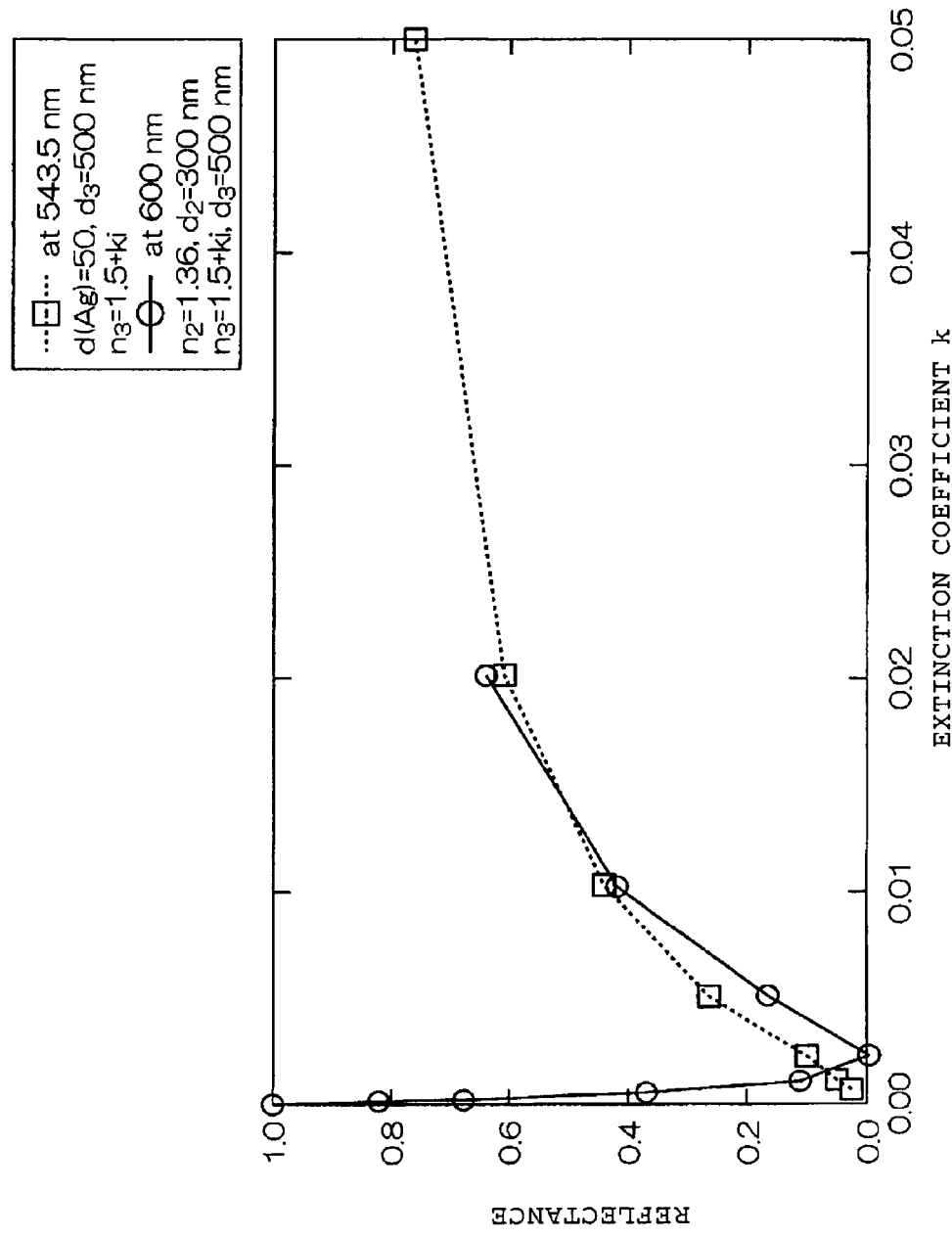
FIG. 7 is a graph showing the relation between the extinction coefficient k and the reflectance with respect to each of the Ag type element and the element of the present invention.

FIG. 7 is a graph showing the relation between the extinction coefficient k and the reflectance of each of the Ag type element (-□-) and the element of the present invention (-○-).

As is evident from FIG. 7, as compared with the Ag type element, with the element of the present invention, the reflectance is changed with a higher sensitivity to an increase of the extinction coefficient k of the optical functional material layer. With the element of the present invention, as the extinction coefficient k increases, an initial sharp decrease region of reflectance and a subsequent slightly mild increase region of reflectance are observed.

Further, actually, a phthalocyanine dye was dispersed in various concentrations in a polymer, thin films were formed, and the reflectances were measured at wavelengths from the visual region to the near infrared region. By plotting the actually measured values of the reflectances to the extinction coefficients k evaluated from the absorbance and the film thickness, it was confirmed that the results of calculation in FIG. 7 are correct. From the results, it was shown that as compared with the system employing a mere change in absorption, with the element of the present invention, it is possible to realize a relatively large change in the light intensity particularly in a region where the change in absorption is small. As a specific example, the measurement was carried out under such conditions that the optical functional material layer was 300 nm, the Cytop layer was 700 nm and the wavelength was 632.8 nm, a light intensity change of 1,600 times at the maximum was observed when the extinction coefficient k was 0.001. This indicates that when the element of the present invention is used, modulation by a low power modulation drive light is possible.

Figure 8:
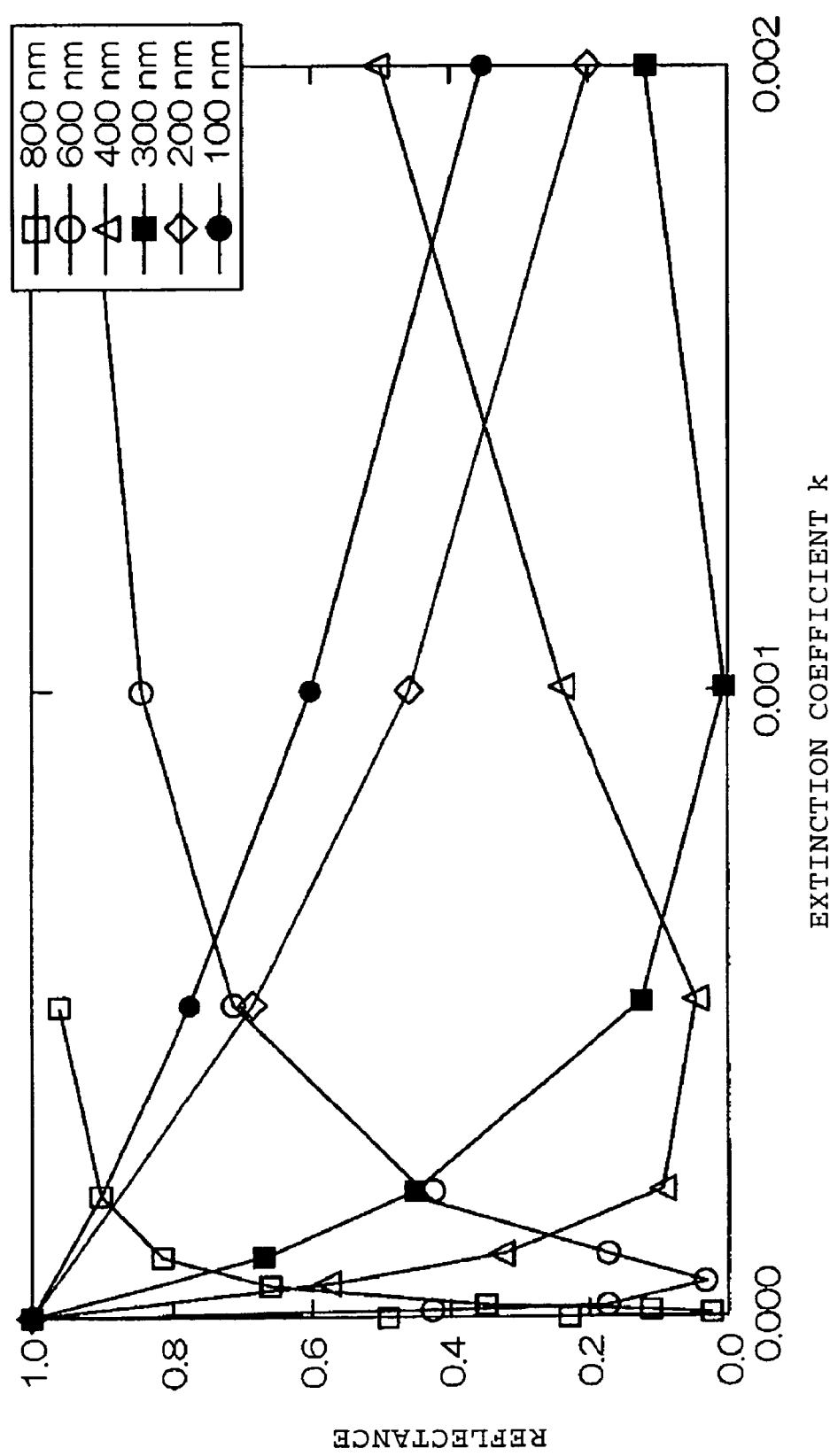
FIG. 8 is a graph showing the relation between the extinction coefficient k and the reflectance in a case where the thickness of the low refractive index layer was changed in a range of from 100 to 800 nm.

FIG. 8 is a graph showing the relation between the extinction coefficient k and the reflectance in a case where in the element of the present invention, the thickness of the low refractive index layer was changed from 100 to 800 nm.

With the element of the present invention, the changing behavior of the reflectance to the change of the extinction coefficient k depends very much on the thickness of the low refractive index layer, and if the thickness is large, a sharp decrease of the reflectance and the subsequent trend for increase are observed, when the value of the extinction coefficient is small.

On the other hand, if the thickness of the low refractive index layer is small, the phenomenon such that the reflectance sharply decreases when the value of the extinction coefficient k is small, will no longer be observed. From such results, it is evident that by selecting the optimum layer thickness in the actual relation with the change of the extinction coefficient k, it is possible to obtain a highly sensitive optical modulation element.

Figure 9:
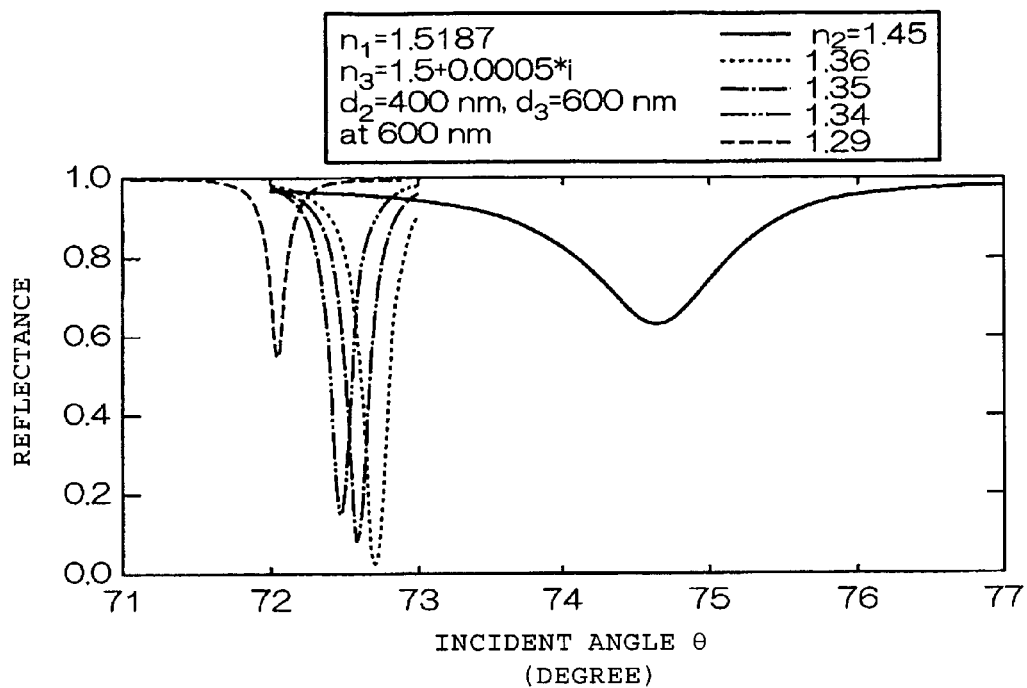
FIG. 9 is a graph showing the relation between the incident angle θ and the reflectance in a case where with the element of the present invention, the real part n of the refractive index of the low refractive index layer was changed.

FIG. 9 is a graph showing the relation between the incident angle θ and the reflectance in a case where in the element of the present invention, the real part n of the refractive index of the low refractive index layer was changed (n=1.29 to 1.45).

Figure 10:
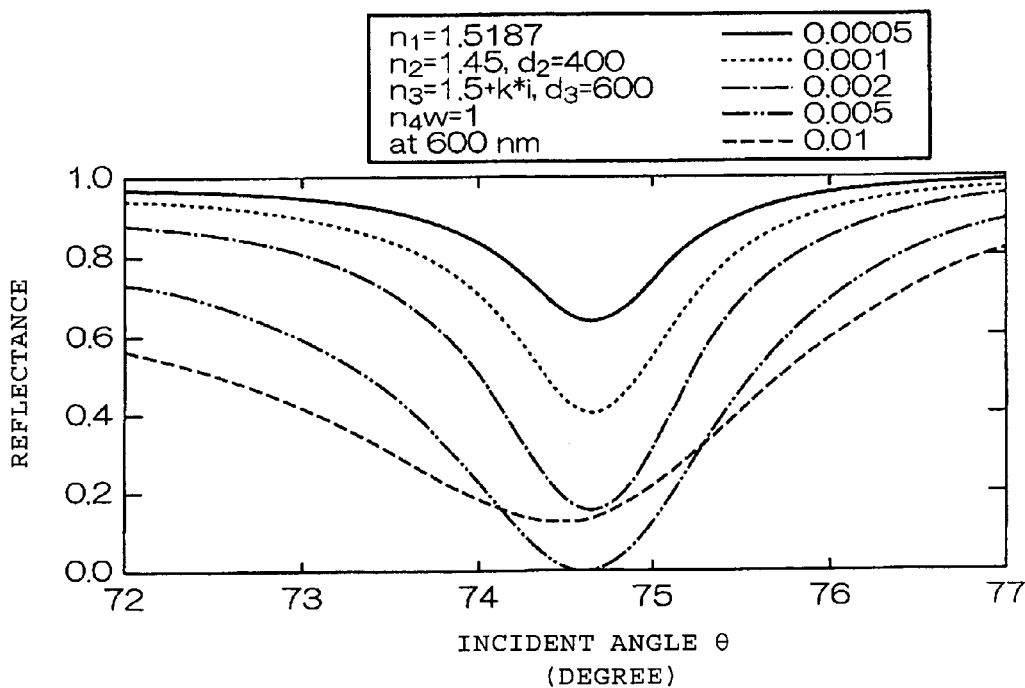
FIG. 10 is a graph showing the relation of the incident angle θ and the reflectance in a case where the value of the extinction coefficient k was changed.

Further, FIG. 10 is a graph showing the relation between the incident angle θ and the reflectance in a case where in the element of the present invention having a low refractive index layer with the real part n of the refractive index being 1.45, the value of the extinction coefficient k was changed.

From these Figs., it is evident that a waveguide mode is formed with ones wherein the real part n of the refractive index of the low refractive index layer is within a range of from 1.29 to 1.45. Further, if the real part n of the refractive index is small, the incident angle θ shifts to the low angle side, and if n is large, it shifts to the wide angle side. The mode incident angle width in each case also depends on the real part n of the refractive index.

Figure 11:
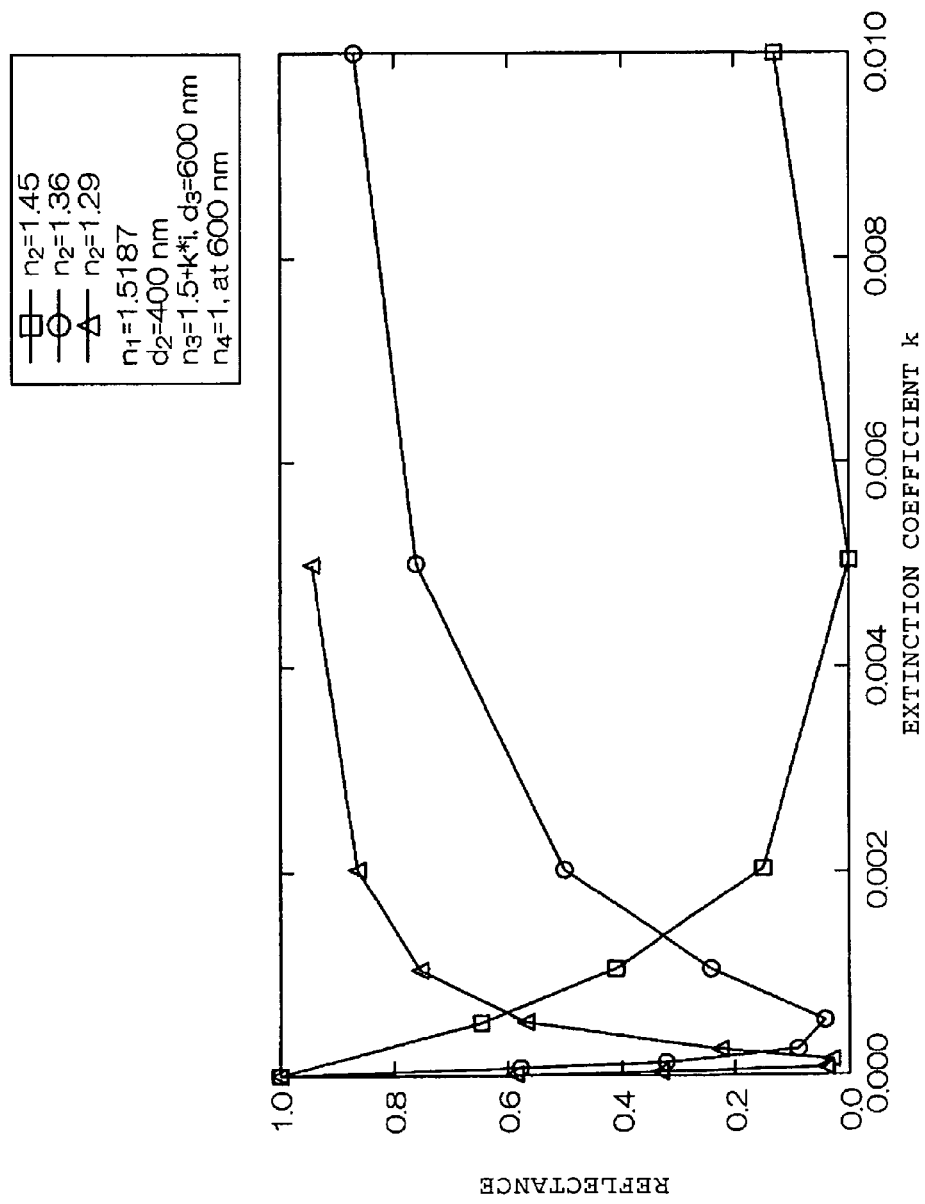
FIG. 11 is a graph showing the relation between the extinction coefficient k and the reflectance in a case where with the element of the present invention, the real part n of the refractive index of the low refractive index layer was changed.

FIG. 11 is a graph showing the relation between the extinction coefficient k and the reflectance in a case where in the element of the present invention, the real part n of the refractive index of the low refractive index layer having a thickness of 400 nm was changed (n=1.29 to 1.45).

With the element of the present invention, the changing behavior of the reflectance to the change of the extinction coefficient k depends very much on the real part n of the refractive index of the low refractive index layer, and if n is small, at the side where the value of k is small, a sharp decrease and the subsequent increase of the reflectance are observed. From such results, it is evident that a highly sensitive optical modulation element can be obtained by selecting the optimum refractive index of the low refractive index layer in the relation with the actual change of the extinction coefficient k, with the element of the present invention.

From the results of the foregoing calculations, it is evident that also in the case of the element of the present invention like in the case of the Ag type element, modulation of the intensity is possible by the change of n or k, and modulation of the phase is possible by the change of n.

Results of Measurements

On one side of a slide glass (refractive index n1=1.52), a thin film having a thickness of 300 nm of a fluoropolymer having an aliphatic ring structure in its main chain obtained by cyclopolymerization as a fluororesin (CYTOP (registered trademark), manufactured by Asahi Glass Company, Limited, refractive index n2=1.34) was formed by a spin coating method. On a low refractive index layer made of this fluororesin, PFVI represented by the formula (8) was laminated by a spin coating method to form an optical functional material layer having a thickness of 220 nm or 400 nm, whereupon the light absorption and reflection characteristics of this low refractive index layer+PFVI layer laminate were investigated.

FIGS. 12 to 17 are the actually measured data of light absorption and reflection characteristics measured by using the above low refractive index layer+PFVI layer laminate.

Figure 12:
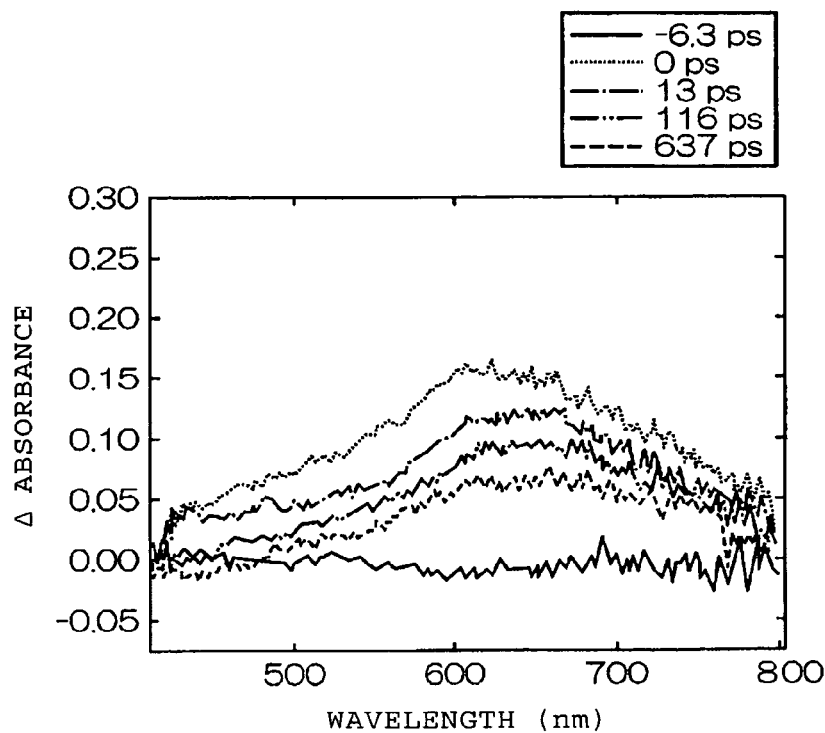
FIG. 12 is a graph showing a transient absorption spectrum when only a PFVI layer having a thickness of 220 nm was excited by a femtosecond laser beam having a wavelength of 400 nm.

FIG. 12 is a graph showing a transient absorption spectrum when only the PFVI layer having a thickness of 220 nm was excited by a femtosecond laser beam having a wavelength of 400 nm.

Figure 13:
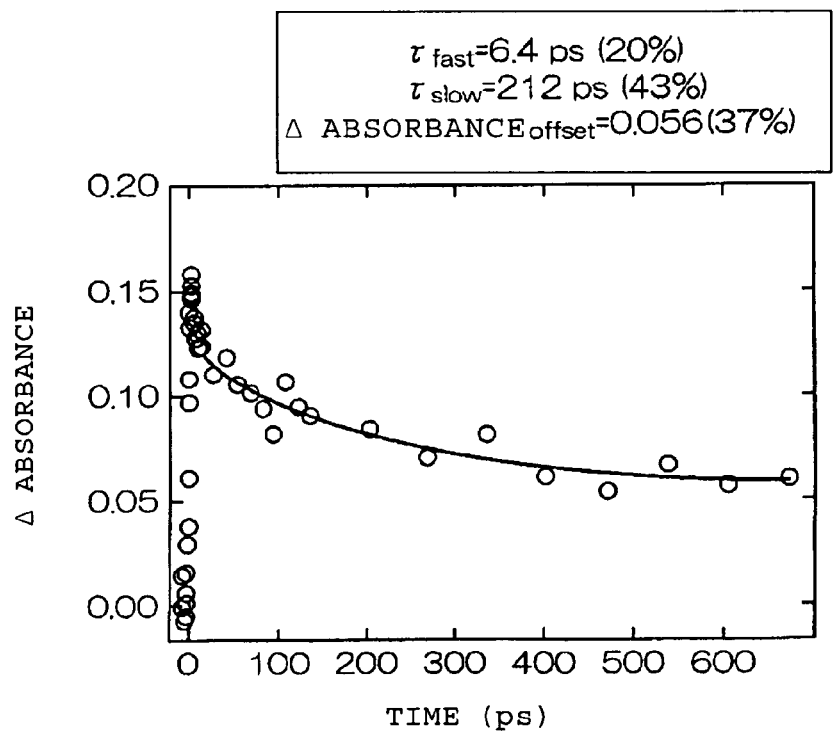
FIG. 13 is a graph showing the change with time of the transient absorption at 630 nm when only a PFVI layer having a thickness of 220 nm was excited by a femtosecond laser beam having a wavelength of 400 nm.

FIG. 13 is a graph showing the change with time of the transient absorption at 630 nm when only the PFVI layer having a thickness of 220 nm was excited by a femtosecond laser beam having a wavelength of 400 nm.

Figure 14:
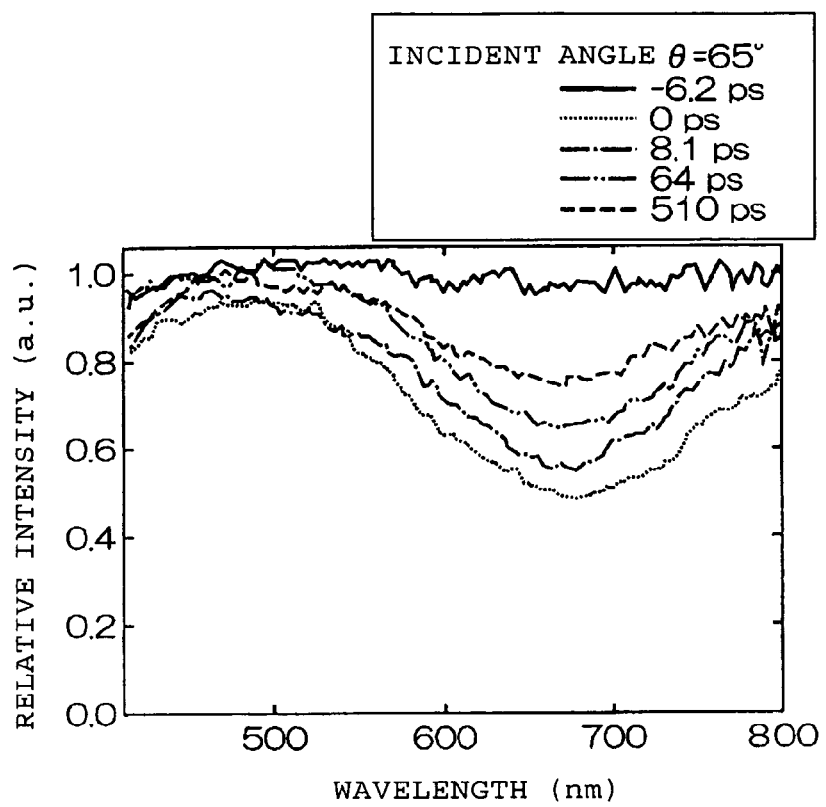
FIG. 14 is a graph showing a transient reflection spectrum when a laminate comprising a PFVI layer having a thickness of 220 nm and a low refractive index layer was excited by a femtosecond laser beam having a wavelength of 400 nm (incident angle θ=65°).

FIG. 14 is a graph showing a transient reflection spectrum when the laminate of the PFVI layer having a thickness of 220 nm and the low refractive index layer, was excited by a femtosecond laser beam having a wavelength of 400 nm (incident angle θ=65').

Figure 15:
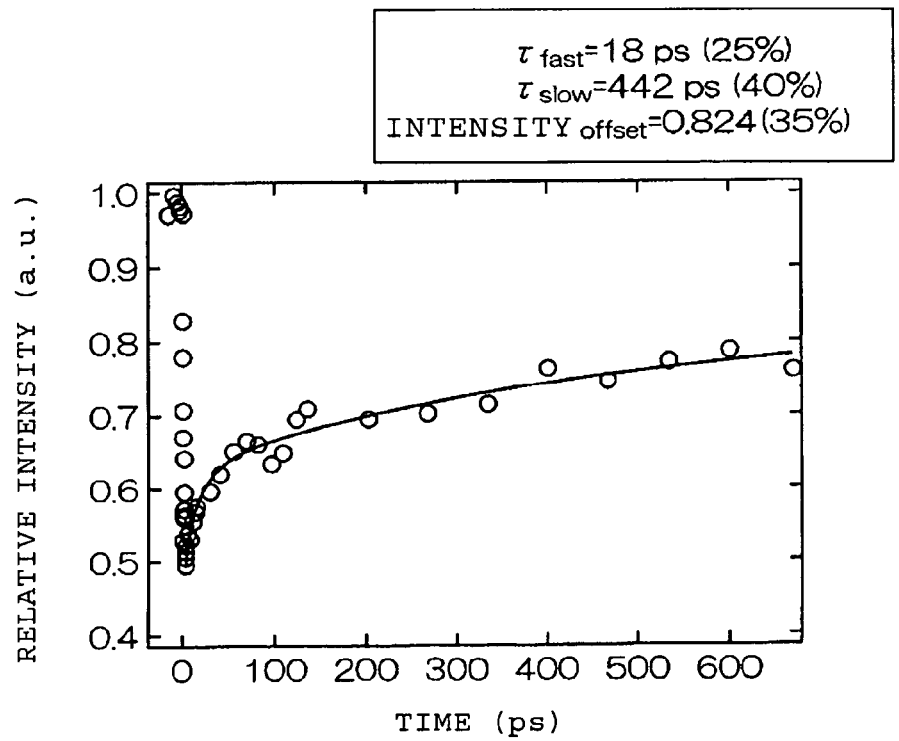
FIG. 15 is a graph showing the change with time of the reflection intensity at 680 nm when a laminate comprising a PFVI layer having a thickness of 220 nm and a low refractive index layer, was excited by a femtosecond laser beam having a wavelength of 400 nm (incident angle θ=65°).

FIG. 15 is a graph showing the change with time of the reflection intensity at 680 nm when the laminate of the PFVI layer having a thickness of 220 nm and the low refractive index layer, was excited by a femtosecond laser beam having a wavelength of 400 nm (incident angle θ=65°).

Figure 16:
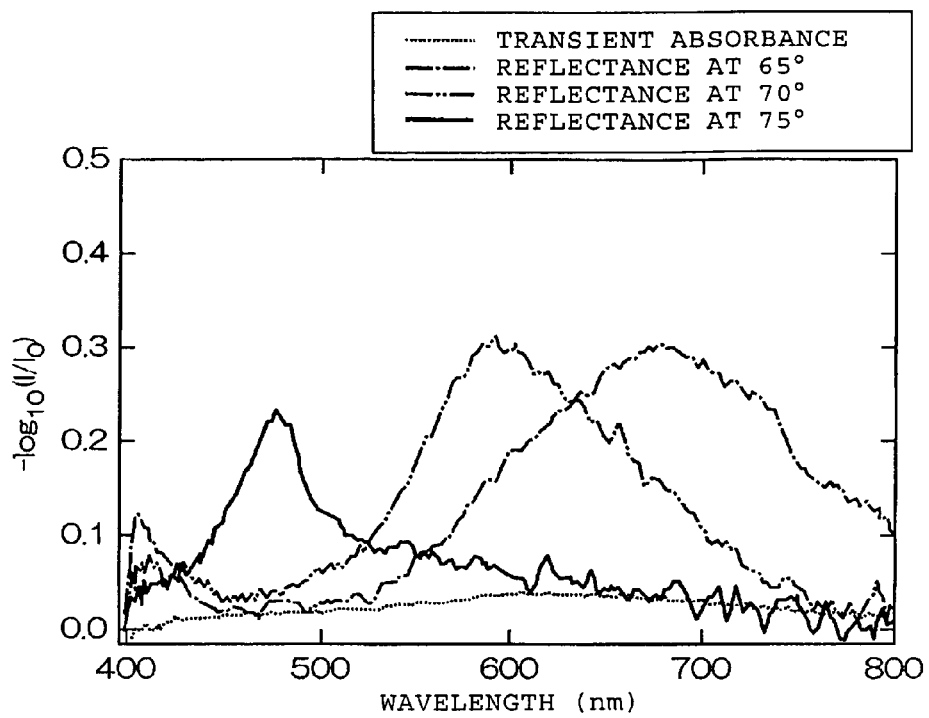
FIG. 16 is a graph showing transient reflections at different incident angles immediately after a laminate comprising a PFVI layer having a thickness of 220 nm and a low refractive index layer was excited by a femtosecond laser beam having a wavelength of 400 nm, and a transient absorption spectrum with the PFVI layer only.

FIG. 16 is a graph showing transient reflections at different incident angles immediately after the laminate of the PFVI layer having a thickness of 220 nm and the low refractive index layer, was excited by a femtosecond laser beam having a wavelength of 400 nm, and a transient absorption spectrum with only the PFVI layer.

Figure 17:
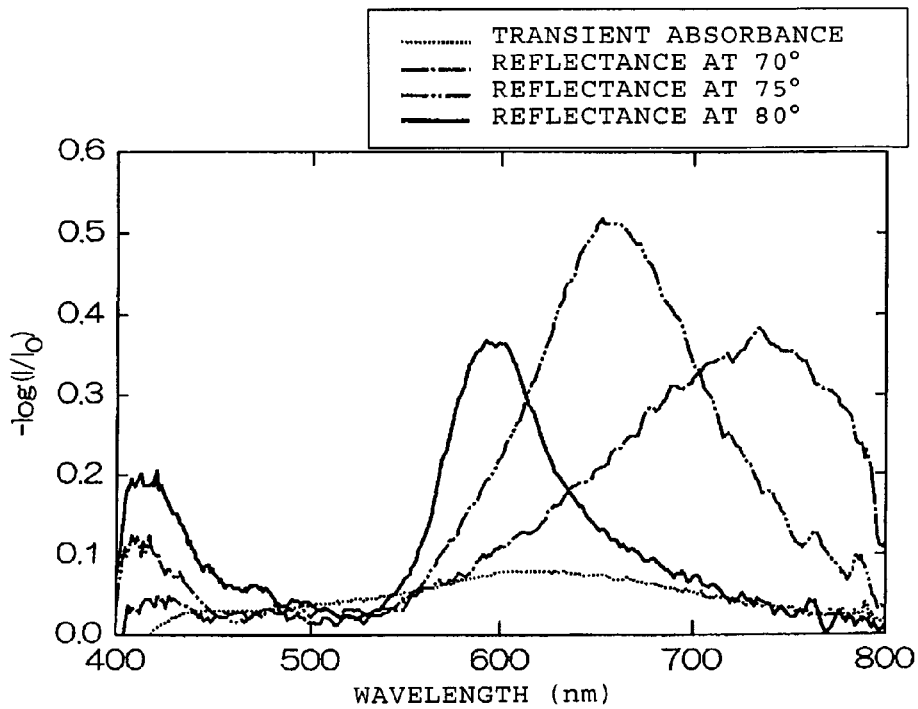
FIG. 17 is a graph showing transient reflections at different incident angles immediately after a laminate comprising a PFVI layer having a thickness of 400 nm and a low refractive index layer was excited by a femtosecond laser beam having a wavelength of 400 nm, and a transient absorption spectrum with the PFVI layer only.

FIG. 17 is a graph showing transient reflections at different incident angles immediately after the laminate of the PFVI layer having a thickness of 400 nm and the low refractive index layer, was excited by a femtosecond laser beam having a wavelength of 400 nm, and a transient absorption spectrum with only the PFVI layer.

From the graphs shown in FIGS. 12 to 17, a temporary change in the femtosecond white light spectrum reflectance was repeatedly confirmed at the time of the femtosecond laser excitation (400 nm) with the PFVI layer laminate showing an ultrahigh speed change by photoelectron transfer in a visible to near infrared region. Thus, the ultrahigh speed operation and the durability of this laminate were confirmed.

Further, the peak of the transient reflectance change spectrum was confirmed to depend on the incident angle θ or the thickness of the optical functional material layer (PFVI layer), and it shifted to the low wavelength side under a wide angle incident condition or with a thick layer. Thus, it was confirmed that with this laminate, a waveguide mode by a femtosecond laser is present.

The change in the reflectance of the laminate with the low refractive index layer was larger by at least ten times, as compared with the change in the transmittance where no refractive index layer was present at the same excitation beam intensity.

Further, the change in the reflectance observed at present is at most 1 pico second during ON and from a few pico seconds to a few hundreds pico seconds during OFF.

INDUSTRIAL APPLICABILITY

According to the present invention, it is possible to present a spatial optical modulation element which is capable of being operated constantly for a long period of time even if a high power laser beam with an ultra-short pulse such as a femtosecond laser beam is used and which is excellent in the durability and has a long life.

The entire disclosure of Japanese Patent Application No. 2003-311823 filed on Sep. 3, 2006 including specification, claims, drawings and summary is incorporated herein by reference in its entirety.

What is claimed is:

1. A spatial optical modulation element, comprising:
a low refractive index layer disposed between a dielectric and an optical functional material layer made of an optical functional material with a refractive index changeable by light irradiation, the low refractive index layer is made of a transparent material with a refractive index lower than a refractive index of the dielectric,
wherein at an interface between the dielectric and the low refractive index layer, reflection of a to-be-modulated light entering through the dielectric is controlled by a modulation drive light, and the control of the reflection of the to-be-modulated light by the modulation drive light is a combination of reflection of the to-be-modulated light and confinement of the to-be-modulated light by a waveguide mode.

2. The spatial optical modulation element according to claim 1, wherein the low refractive index layer is made of an organic material.

3. The spatial optical modulation element according to claim 1, wherein the low refractive index layer is made of a fluororesin.

4. The spatial optical modulation element according to claim 3, wherein the fluororesin is a non-crystalline fluororesin having no C—H bond.

5. A spatial optical modulation method, comprising:
utilizing a spatial optical modulation element wherein disposed between a dielectric and an optical functional material layer made of an optical functional material with a refractive index changeable by light irradiation, is a low refractive index layer made of a transparent material with a refractive index lower than a refractive index of the dielectric, and
controlling reflection of a to-be-modulated light entering through the dielectric at an interface between the dielectric and the low refractive index layer by a modulation drive light, and the controlling of the reflection of the to-be-modulated light by the modulation drive light is a combination of reflection of the to-be-modulated light and confinement of the to-be-modulated light by a waveguide mode.

6. The spatial optical modulation element according to claim 2, wherein the low refractive index layer is made of a fluororesin.

7. The spatial optical modulation element according to claim 6, wherein the fluororesin is a non-crystalline fluororesin having no C—H bond.

* * * * *